United States Patent
Krishnaswamy

(10) Patent No.: US 7,620,947 B2
(45) Date of Patent: Nov. 17, 2009

(54) ENHANCED DIRECTED GRAPH REPRESENTATION FOR DEPENDENCY SYSTEMS

(75) Inventor: Ravinder P. Krishnaswamy, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 812 days.

(21) Appl. No.: 11/077,966

(22) Filed: Mar. 11, 2005

(65) Prior Publication Data
US 2006/0206872 A1 Sep. 14, 2006

(51) Int. Cl.
*G06F 9/45* (2006.01)

(52) U.S. Cl. .................. 717/157; 717/156; 717/158; 717/143; 717/144

(58) Field of Classification Search .......... None
See application file for complete search history.

(56) References Cited

U.S. PATENT DOCUMENTS 7,102,641 B2 * 9/2006 Hudson, Jr. .................. 345/440

* cited by examiner

*Primary Examiner*—Chuck O Kendall
(74) *Attorney, Agent, or Firm*—Fish & Richardson P.C.

(57) ABSTRACT

Methods for representing and evaluating dependency systems are provided. In one implementation a method is provided. The method includes receiving a file. The file includes a node array having data entries corresponding to one or more nodes. The file also includes an edge array having data entries corresponding to one or more edges, the edge entries identifying an invertability state of an edge, a suppressed state of an edge, and one or more partner edge linking a first and a second edge in the edge array. The method also include processing the received file. In another implementations a method for evaluating dependencies in a cyclic system is provided as well as a method for evaluating an enhanced directed dependency graph.

28 Claims, 9 Drawing Sheets

ENHANCED DIRECTED GRAPH REPRESENTATION FOR DEPENDENCY SYSTEMS

BACKGROUND

The present invention relates to computer aided design.

Conventional computer aided design ("CAD") systems allow a user to design structures and devices that include a number of components. Typically, CAD system components can include one or more stored object models representing standard structures such as windows, doors, or other mechanical or design objects. In some CAD systems, the object models can include one or more numerical fields through which an object can be modified.

Typically, an object can include a number of editable elements that define the object. For example, FIG. 1A illustrates a window object 100. The window object includes three elements, which define the window object 100. A width element 102, a height element 104, and a model number element 106. The model number may define the geometry of window 100 as well as the dimensions. Similarly, specific values for height 104 and width 102 elements can define a particular model number 106 for the window 100.

Elements of an object can depend on other elements of the object and the objects can depend on other objects. Object dependencies can exist between heterogeneous elements and homogeneous elements. Heterogeneous elements typically include elements representing text, geometry, and dimensions. Homogenous elements typically include numerical fields. Conventional fields can have dependencies, where values are calculated from the resultant values from other fields. Fields can be embedded as properties of elements or, alternatively, as sub elements of complex elements such as tables. Typically fields can also be edited, for example, by user input.

Conventionally, dependency relationships between elements of an object or between different objects can be described by dependency graphs. FIG. 1B shows a dependency graph 120 for the window object 100 of FIG. 1A. The dependency graph 120 shows a representation of the relationships between elements in window object 100 where each element of the window object 100 is represented by interconnected nodes. The window dimension node 122 can be manipulated by editing the values in the other nodes because the window dimension has been defined as depending upon the height 104 and the width 102 of the window object 100. The width node 124, height node 126, and model number node 128 can be edited. A pair of oppositely directed arrows 130 indicates that the dependencies are simultaneously considered, resulting in a cyclic directed dependency graph. When objects include cyclic dependencies, determining the order in which dependent nodes are evaluated can be complex.

In other cases, the dependencies are not cyclic. FIG. 2 shows an example of an acyclic dependency graph 200 relating area to width and height. The dependency is formula driven in that the width is defined as a function of height (e.g., Width=2×Height) and the area is defined as a function of both the width and the height (Area=Width×Height). As a result, an edit to height node 202 results in a change in the width node 204. Additionally, the area node 206 then depends on the value of the height node 202 and the width node 204. The dependencies are shown by directed arrows 208 called edges.

When the object dependencies form a directed acyclic graph, the evaluation of the dependencies based on an edit to an node can be determined using, for example, a topological sort of the directed acyclic graph. In one implementation, a topological sorting technique can be used to evaluate the order of a directed acyclic graph, such as the directed acyclic graph 200 shown in FIG. 2.

For example, in evaluating the directed acyclic graph 200, a first step can be the removal of any nodes that do not have incoming edges. In the directed acyclic graph 200, the height node 202 does not have any incoming edges. The height node 202 can therefore be removed first. Nodes can be numbered, for example, in ascending order, as they are removed such that height 202 becomes node number one. With the height node 202 removed (along with the associated outgoing edges), the graph is re-evaluated to identify the nodes then having no incoming edges. The nodes without incoming edges after re-evaluation can be removed. In the example, the width node 204 is removed and numbered as node two because once the height node 202 is removed along with the associated outgoing edges, there are no incoming edges to width node 204.

The process can continue in a similar fashion until all the nodes are removed. The area node 206 is therefore the last node removed and numbered as node three. The numbering of the nodes provides an evaluation order such that when the nodes are evaluated in increasing numerical order all the incoming edges to a node being evaluated are from nodes, which have already been evaluated. Additionally, other evaluation techniques can be used to determine the ordering of acyclic dependency systems.

SUMMARY

Methods for representing and evaluating dependency systems are provided. In general, in one aspect, a method is provided. The method includes receiving a file. The file includes a node array having data entries corresponding to one or more nodes. The file also includes an edge array having data entries corresponding to one or more edges, the edge entries identifying an invertability state of an edge, a suppressed state of an edge, and one or more partner edge linking a first and a second edge in the edge array. The method also include processing the received file.

Implementations of the invention can include one or more of the following advantageous features. The data entry for each node can further include an identifier for a beginning and ending point for each incoming and outgoing edge to the node. The data entry for each edge can include an identifier of each node associated with the edge, an identifier of the edge as invertible, and a flag identifying a suppression state of the invertible edge. The data entries for the edge array can also include an identifier for each partner link between pairs of invertible edges. The file can be processed to create an enhanced directed dependency graph using the data entries in the node and edge arrays.

In general, in one aspect, a method for evaluating dependencies in a cyclic system is provided. The method includes receiving a description of a cyclic system and receiving a particular activation context. The method also includes creating an activation directed acyclic graph for the particular activation context and evaluating the dependencies upon a change of a state of the cyclic system in accordance with the activation context.

Implementations of the invention can include one or more of the following advantageous features. The method can further include creating an enhanced directed dependency graph description of the cyclic system, including introducing one or more delay nodes operable to provide a particular activation order in an activation directed acyclic graph. The method can further include positioning delay node along an edge between a first node and a second node. The delay node can be connected to a destination node by an invertible edge.

In general, in another aspect, a method for evaluating an enhanced dependency graph is provided. The method includes adding an initially edited node to a queue and activating a first node in the queue. The method also includes suppressing any partner incoming invertible edge for each outgoing non-suppressed invertible edge leading from the first node. The method also includes adding a next node incident to the first node through outgoing non-suppressed invertible edges to the queue and activating the next node in the queue.

Implementations of the invention can include one or more of the following advantageous features. The method can further include suppressing any partner incoming invertible edge for each outgoing non-suppressed invertible edge leading from the next node and adding one or more nodes incident tot eh next node through outgoing non-suppressed invertible edges to the queue. The method can also further include suppressing any remaining nodes and edges of the enhanced directed dependency graph when the queue is empty.

The invention can be implemented to realize one or more of the following advantages. Relationships between elements of objects can be represented in dependency graphs. The elements of an object can include multiple and interrelated dependencies. Cyclic dependency systems can be processed piecemeal; that is representations of a subset of the dependencies can be made using conditionally acyclic dependency graphs to allow for evaluation of dependency nodes more easily and without the need for constraint solvers or other complex solving techniques.

A compact enhanced directed dependency graph can be created, which can be used to derive a number of distinct directed acyclic graphs representing different subset dependency relationships. Invertible edges can be introduced between nodes, which can be defined in a suppressed or non-suppressed state to create the enhanced directed dependency graph. The suppression of an invertible edge can be established using a partner link between two invertible edges. The dependency relationship between nodes in an enhanced directed dependency graph can be evaluated using an activation algorithm. The activation algorithm can be used to define a subset of nodes and edges in the graph for a particular activation set to provide an activation directed acyclic graph. Delay nodes can be added between nodes to provide a particular activation order. The delay path can include an invertible edge between the last delay node and the destination node to provide suppression.

The nodes and edges used in an acyclic graph can be stored in a drawing file for use in a CAD program. The data included in a drawing file can provide information regarding the relationships between nodes and edges. An acyclic graph can be reconstructed using the data stored in a memory, e.g., a persistent memory. The nodes and edges of a generated enhanced directed dependency graph can be stored as entries in one or more arrays which can be read to reconstruct the dependency graph. The data stored can include an invertibility state of an edge, the suppressed state of an edge, and partner links between pairs of invertible edges.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A system is provided where a cyclic dependency system can be modified to be represented as an acyclic system. The cyclic dependency system can be conditionally acyclic depending on which node or nodes have been activated (e.g., which elements of an object have been edited) in the dependency system. A directed acyclic graph representing a subset of the cyclic dependency system can be constructed. Evaluating the directed acyclic graph can provide the correct evaluation order for the dependent nodes based on an activation context (e.g., using a topological sorting technique on the directed acyclic graph). The activation context defines the nodes that are being changed. An activation directed acyclic graph ("ADAG") describes a directed acyclic graph formed using a particular activation context. Additionally, an activationally acyclic dependency system ("AADS") can be used to indicate a class of dependency systems from which ADAGs can be constructed.

An AADS is used to produce a directed acyclic graph from a cyclic dependency system for the particular set of nodes that are directly edited. Using the edited nodes, a subset of directed edges can be excluded from consideration in forming a directed acyclic graph during the evaluation of the dependencies associated with the edited nodes. A directed acyclic graph in which a subset of the directed edges has been excluded results in an enhanced directed dependency graph ("EDDG"). The EDDG can be evaluated, used, or otherwise processed.

Figure 1A:
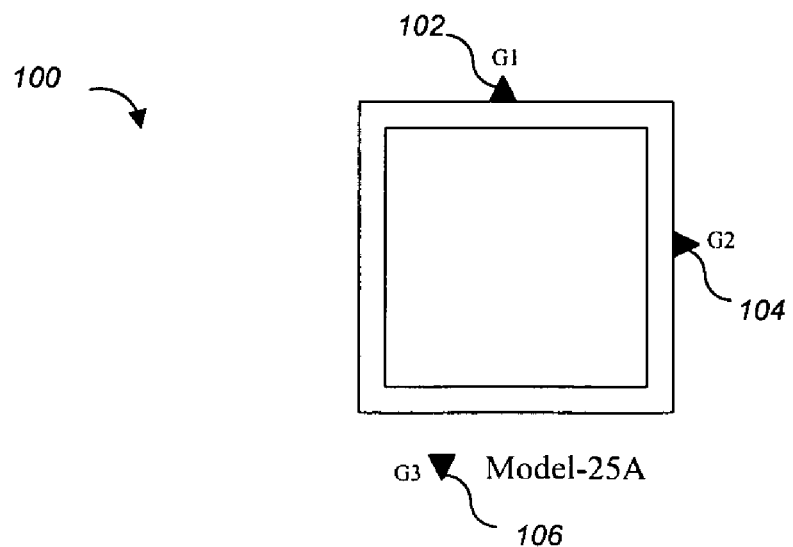
FIG. 1A shows a CAD object including editable elements.
Figure 1B:
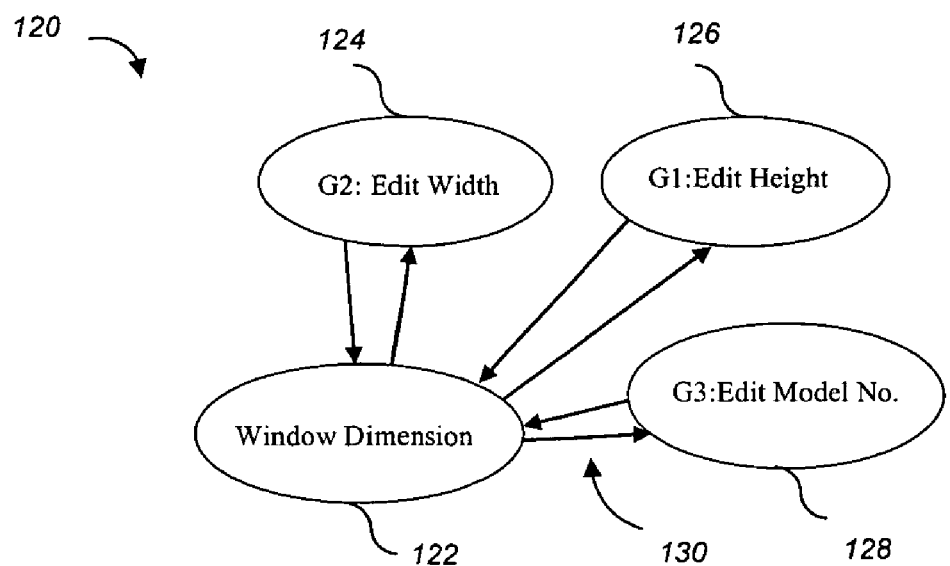
FIG. 1B shows a cyclic dependency graph for the elements of the window object in FIG. 1A.
Figure 2:
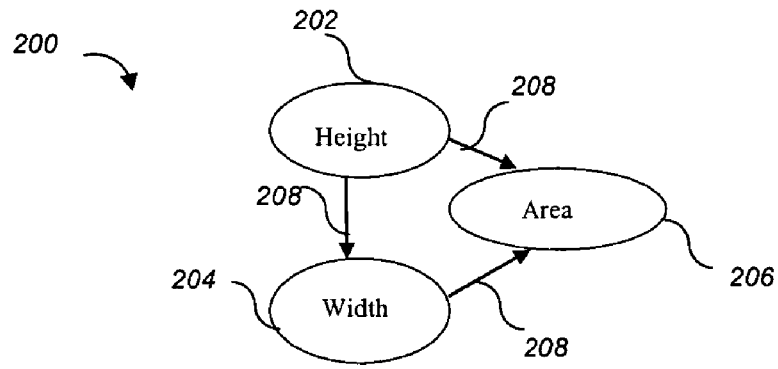
FIG. 2 shows an acyclic dependency graph.
Figure 3:
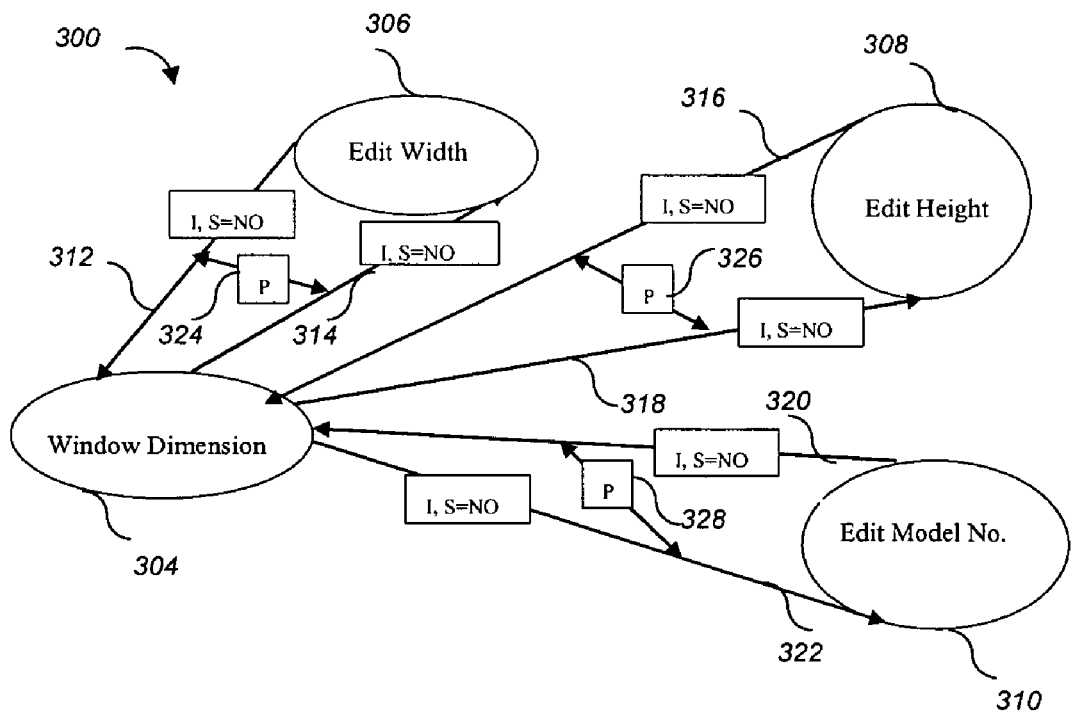
FIG. 3 shows an enhanced directed dependency graph ("EDDG") including invertible edges.

FIG. 3 shows one example of an EDDG 300 generated from the cyclic dependency graph of FIG. 1B. The EDDG 300 includes nodes for window dimension 304, edit width 306, edit height 308, and edit model number 310. The EDDG 300 includes modified directed edges which include invertible edges 312, 314, 316, 318, 320, and 322. Two invertible edges form a pair of linked directed edges between two nodes. Between pairs of invertible edges are partner links 324, 326, and 328.

Each invertible edge in a pair of invertible edges is oppositely directed. For example, the invertible edge 312 can link the edit width node 306 to the window dimension node 304. The oppositely directed invertible edge 314 is paired with the invertible edge 312 and links the window dimension node 304 with the edit width node 306. The pair of invertible edges 312, 314 includes a partner link 324. The partner link 324 forms a bidirectional link between the first and second invertible edges, (i.e., invertible edges 312, 314). Each invertible edge includes data indicating that the edge is an invertible edge and a state of the edge as either suppressed or non-suppressed. In one implementation, the default state of each invertible edge is non-suppressed. When the nodes of EDDG 300 are evaluated according to a particular activation context, either the first or the second invertible edge of each pair of invertible edges is assigned a suppressed state when one of the nodes associated with the pair of invertible edges is activated. The partner link (e.g., partner link 324) allows for a change in the state of one invertible edge of a pair of invertible edges when the other invertible edge of the pair is outgoing from an activated node. For example, when an invertible edge is outgoing from an activated node, the incoming invertible edge of the invertible edge pair can be suppressed through the partner link.

Forming an ADAG from an EDDG

An ADAG is a connected dependency subgraph of the EDDG that forms a directed acyclic graph for a particular activation context (e.g., for the nodes in a given activation set). An activate algorithm can be applied to the activated nodes of an activation set. In one implementation the activation set includes one or more nodes of the EDDG that are directly edited (e.g., activated). In another implementation, if the activate algorithm provides a dependency graph that is cyclic, then the EDDG is invalid for the particular activation set. The activation algorithm can perform a process called a breadth of first traversal from the node or nodes in the activation set. The result of the breadth of first traversal process can set the directions of the invertible edges in the EDDG to provide an ADAG for the activation set.

Figure 4:
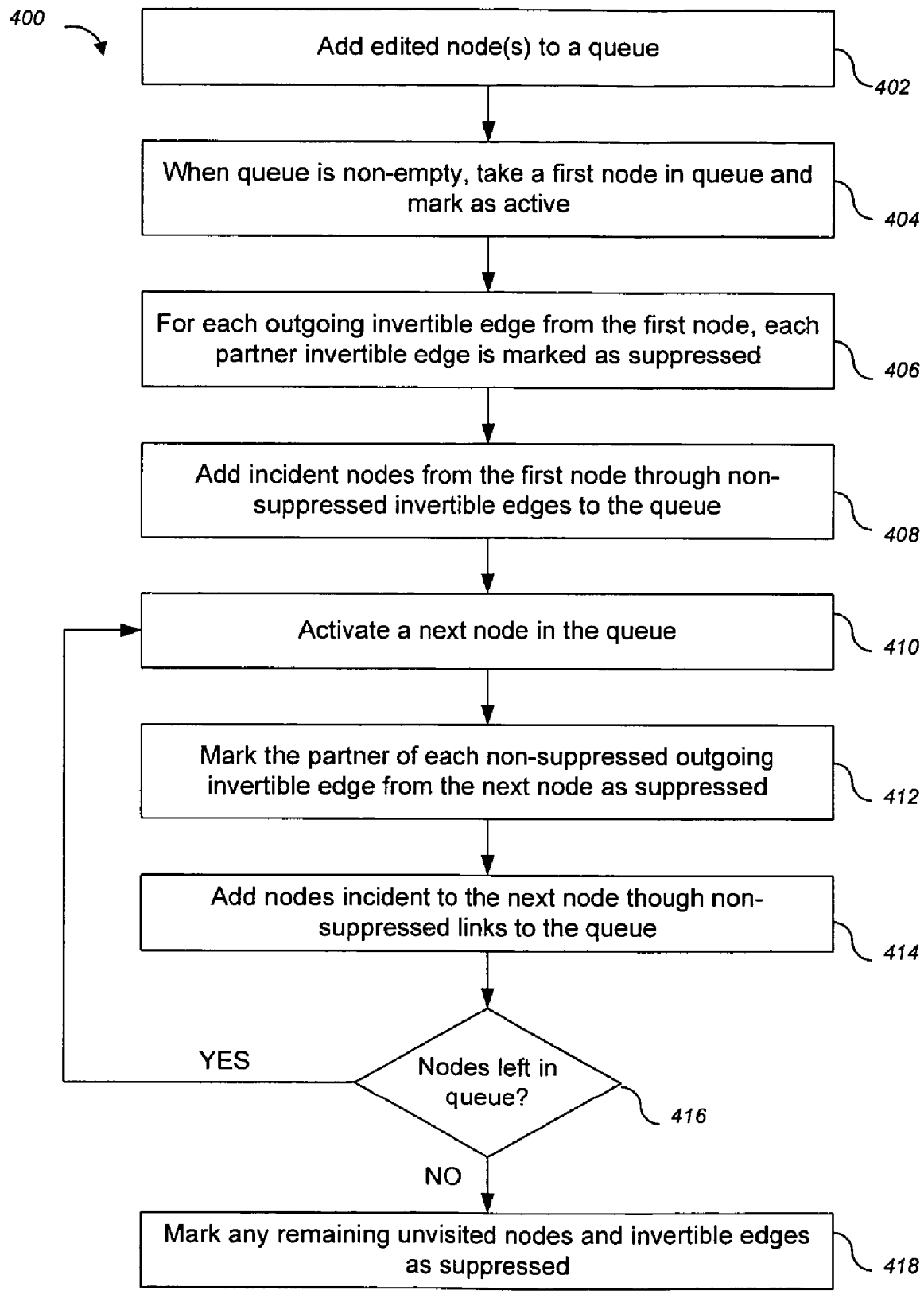
FIG. 4 is a method for activating nodes associated with an EDDG to form an activation directed acyclic graph ("ADAG").

FIG. 4 shows a process 400 (e.g., process for an activation algorithm) for activating nodes in an EDDG in order to form a particular ADAG. When one or more nodes from an EDDG is activated, each node is placed in a queue (step 402). For example, a node can be initially activated when an object element is edited by a user of a CAD program. In a dependency system, the editing of an element of an object can mandate a modification of other values in the object or in other associated objects.

When the queue is non-empty, the first node in the queue is marked as active (step 404). For each outgoing invertible edge from the first node, each partner invertible edge is marked as having a suppressed state (step 406) (e.g., the suppressed state of the invertible edge is marked as "YES" in the data associated with the invertible edge). Nodes that are incident to the first node through one or more non-suppressed invertible edge are added to the queue (step 408). In one implementation, at each step in which new nodes are added to the queue, the nodes can be added in any order without affecting subsequent dependency evaluation. In another implementation, a particular order can be enforced as discussed in further detail below.

The next node in the queue is then activated (step 410). The partner of any non-suppressed and outgoing invertible edge from the next node is then also marked as having a suppressed state (step 412). Any nodes incident to the next node along the non-suppressed outgoing invertible edges are then added to the queue (step 414). The queue is then checked for remaining nodes (step 416). If there are nodes remaining in the queue, steps 410-414 are repeated for each node in the queue until the queue is empty. When the queue is empty, any remaining unvisited nodes and invertible edges are marked as suppressed (step 418). The resulting graph of activated nodes and non-suppressed invertible edges forms an ADAG that can be used to evaluate the object dependencies system. The ordering of the dependencies can require additional operations including, for example, performing a sorting technique on the ADAG.

Figure 5:
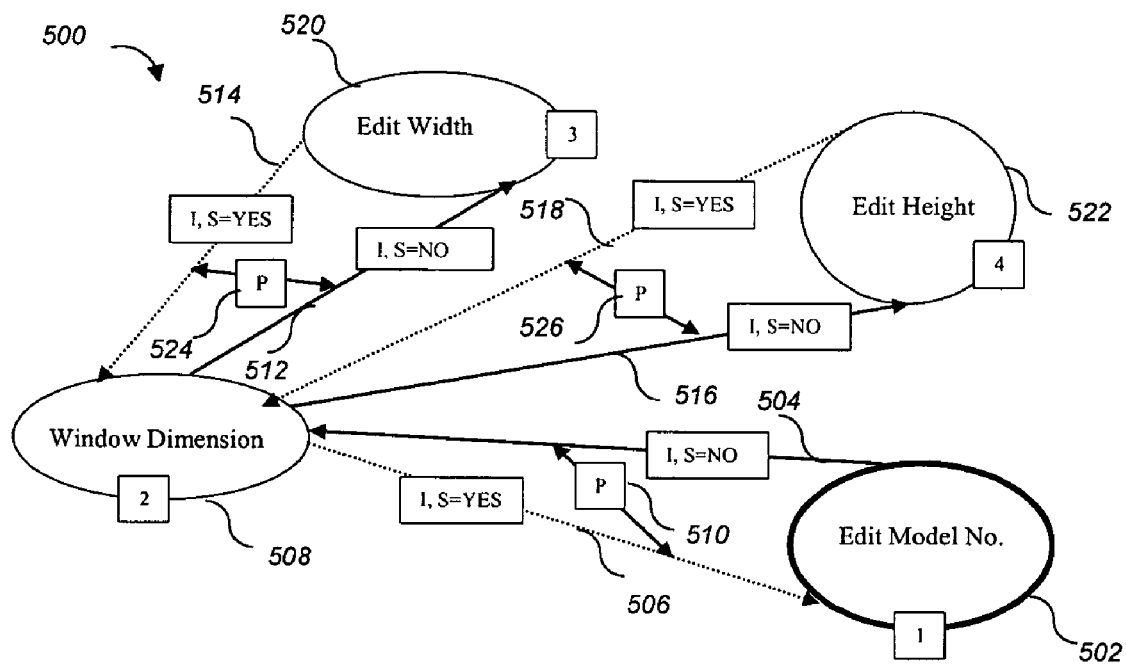
FIG. 5 shows an ADAG based on the EDDG of FIG. 3

FIG. 5 illustrates on example of an ADAG 500 that can be formed from the EDDG 300 when the initial activation of an edit model number node 502 according to the activation algorithm in accordance with the process described above in FIG. 4. The ADAG 500 includes edit model number node 502, a window dimension node 508, an edit height node 522 and an edit width node 520.

To begin the process, the edit model number node 502 is added to the queue (step 402). As the first node of the queue, the edit model number node 502 is marked as active (step 404). The edit model number node 502 has a pair of invertible edges 504 and 506 linking the edit model number node 502 with the window dimension node 508. Invertible edge 504 is outgoing from the edit model number node 502 and, therefore, the partner incoming invertible edge 506 is marked as suppressed through partner link 510 (step 406). The window dimension node 508 is then added to the queue (step 408).

As the next node in the queue, the window dimension node 508 is activated (step 410). The partner of each non-suppressed invertible edge outgoing from the window dimension node 508, is then marked as having a suppressed state (step 412). There are two outgoing invertible edges 512 and 516 from the window dimension node 508. Invertible edge 512 is directed toward the edit width node 520 and the invertible edge 516 is directed toward the edit height node 522. Outgoing invertible edge 506 from the window dimension node 508 to the edit model number node 502 was previously suppressed through partner link 510.

Invertible edge 512 has a partner invertible edge 514, which is marked as suppressed through partner link 524. Similarly, the invertible edge 516 has a partner invertible edge 518, which is marked as suppressed through partner link 526. The edit width and edit height nodes 520 and 522, which are incident to the window dimension node 508 through the outgoing invertible edges 512 and 516 are then added to the queue for activation (step 414). The process continues for any remaining nodes in the queue (step 416). The edit width and edit height nodes 520 and 522 remain in the queue and are activated and analyzed in turn (step 410). Neither the edit height node 520 nor edit width node 522 have any non-suppressed outgoing invertible edges or incident nodes through non-suppressed links because the outgoing invertible edges 514 and 518 have already been suppressed (steps 412 and 414). Therefore, after the edit height node 520 and edit width node 522 are activated, there are no further nodes in the queue (step 416). Once the queue is empty, there are no remaining unactivated nodes in the ADAG 500 to mark as suppressed, ending the activation algorithm process (step 418).

The ADAG 500 resulting from the process 400 provides a directed acyclic graph that is a subset of the EDDG 300. Distinct ADAGs can be formed in a similar manner based on the activation of the edit width node 520 or the edit height node 522. In each case, the resulting ADAG subgraph can be sorted to evaluate all the dependent nodes (e.g., using a topological sort).

Enforcing Activation Order

Figure 6A:
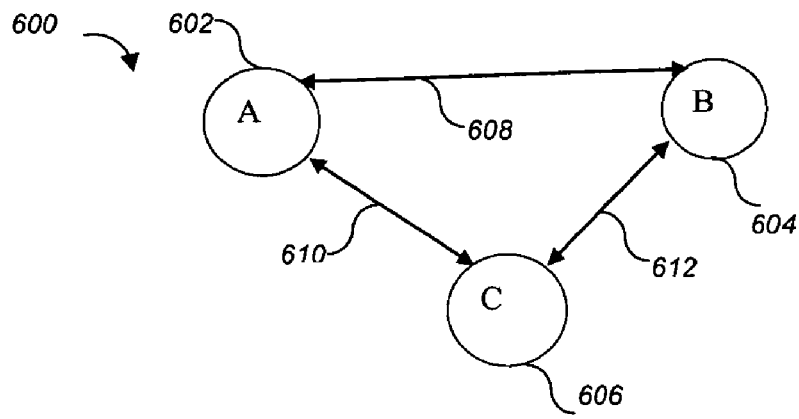
FIG. 6A shows an EDDG including three nodes.

In one implementation, a specific order of activation can be provided. FIG. 6A shows an example EDDG 600. EDDG 600 includes nodes A 602, B 604, and C 606 linked together by invertible edge pairs 608, 610, and 612. Invertible edge pair 608 links nodes A 602 and B 604. Invertible edge pair 610 links nodes A 602 and C 606. Finally, invertible edge pair 612 links nodes B 604 and C 606. In EDDG 600, each invertible edge pair (e.g., invertible edge pairs 608, 610, and 612), which also includes an associated partner link, are shown as a single bidirectional edge for simplicity. In one implementation, if the activation set is defined as {A} (e.g., just the node A 602 is initially activated), then a particular application can require an activation order of the remaining nodes such that node B 604 be activated prior to node C 606.

Figure 6B:
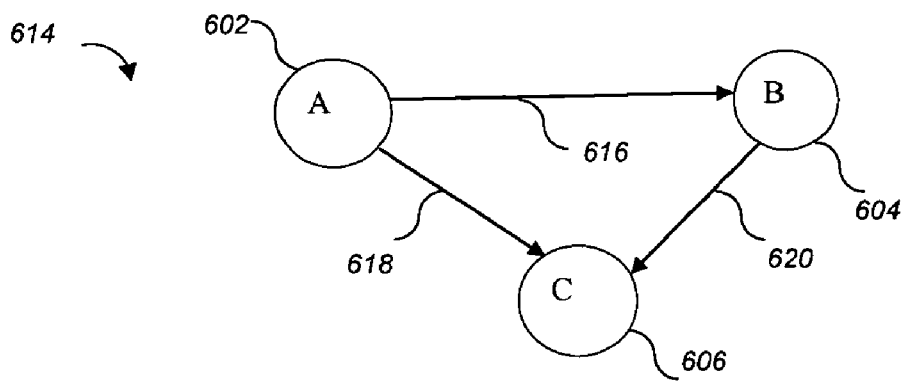
FIGS. 6B-6C show ADAGs formed from the EDDG of FIG. 6A.

FIG. 6B shows an ADAG 614 formed using the activation set of {A} of the EDDG 600 in which the edge directions have been set according to the activation algorithm. ADAG 614 includes directed edge 616 from node A 602 to node B 604, directed edge 618 from node A 602 to node C 606, and directed edge 620 from node B 604 to node C 606.

Figure 6C:
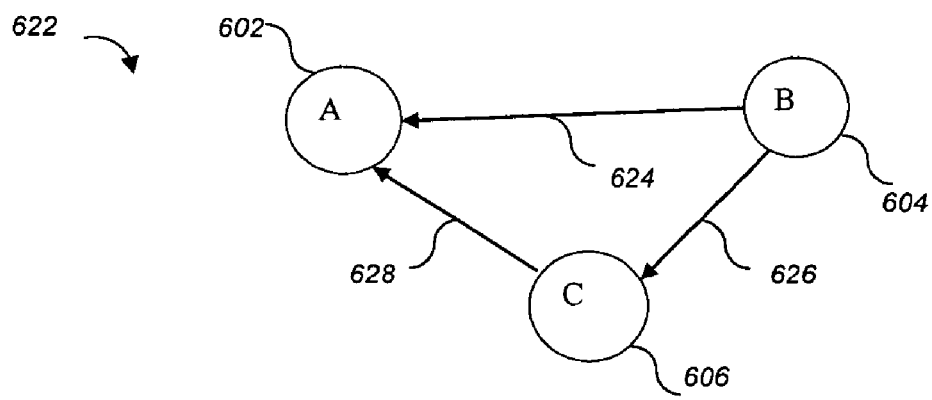

In another implementation, the activation set can be {B} (e.g., only node B 604 initially activated) such that an activation order of the remaining nodes provides that node C 606 is activated before node A 602 for the ADAG 622 shown in FIG. 6C. ADAG 622 includes directed edge 624 from node B 604 to node A 602, directed edge 626 from node B 604 to node C 606, and directed edge 628 from node C 606 to node A 602.

Figure 7:
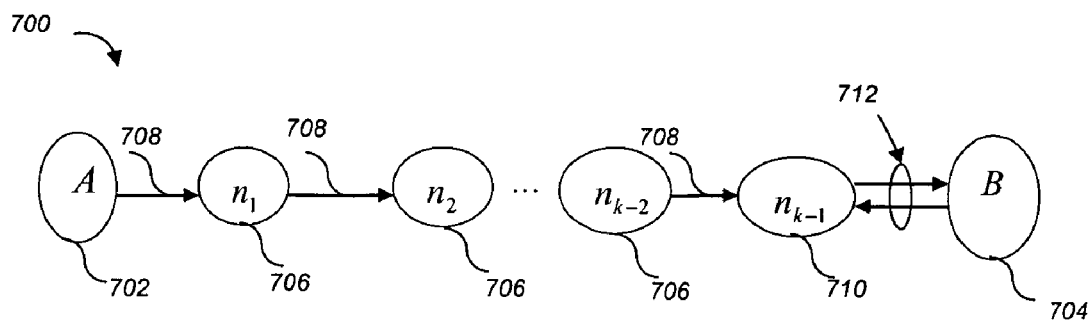
FIG. 7 shows a delay path between nodes.

In order to provide a particular order of activation for the nodes in ADAGs 614 and 622, a delay path can be inserted between nodes. The delay path can be used to increase the delay or number of steps in activating a node along a path. The length of a delay path can be defined, for example, by an algorithm or by design during the creation of a particular object or objects. FIG. 7 shows an example of a delay path 700 from node A 702 to node B 704. The delay path 700 from node A 702 to node B 704 includes a number of delay nodes 706 and a last delay node 710. The delay nodes are linked together in series by directed edges 708 between node A 702 and a last delay node 710. A pair of invertible edges 712 links the last delay node 710 with the node B 704. The delay nodes 706 and 710 provide a delay k between the activation of node A 702 and node B 704. As shown in FIG. 7, there are k-1 nodes used to provide the delay of k.

Figure 8:
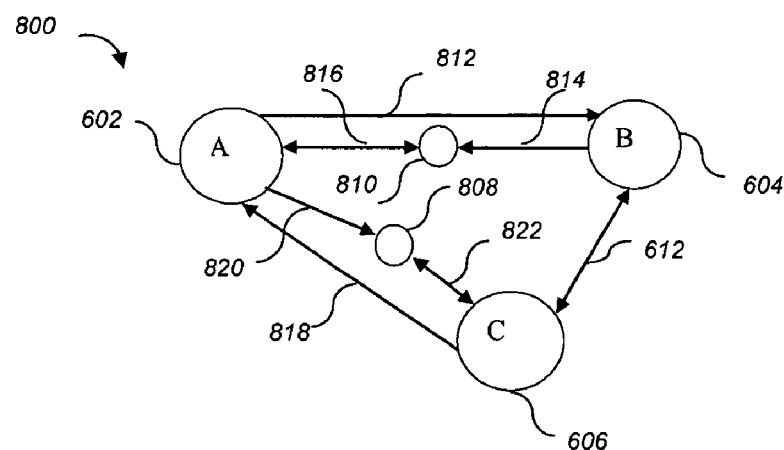
FIG. 8 shows an EDDG including delay paths.

In one implementation, a particular activation order for nodes in an EDDG can be enforced by inserting one or more pre-defined delay paths between nodes in order to provide a particular activation sequence. The EDDG 600 of FIG. 6A can be modified to include delay paths for enforcing activation order. FIG. 8 shows an example EDDG 800 as a modified version of EDDG 600 that includes delay paths. The EDDG 800 includes nodes A 602, B 604, and C 606. The EDDG 800 also includes delay nodes 808 and 810. An invertible edge pair 612 links node B 604 to node C 606. Invertible edge pairs 608 and 610 (FIG. 6) have been modified to include the delay nodes 808 and 810. Thus, the node A 602 and B 603 are coupled by a directed edge 812 from node A 602 to node B 604. The reverse path, however, includes a directed edge 814 from node B 604 to delay node 810 and an invertible edge 816 from delay node 810 to node A 602. Similarly, the node C 606 is linked to node A 602 by a directed edge 818. The reverse path from node A 602 to node C 606 includes a directed edge 820 linked to the delay node 808 and an invertible edge 822 linked between the delay node 808 and the node C 606.

The EDDG 800, including the delay nodes 808 and 810, can provide an ADAG having a particular order of activation. For example, for the activation set {A} described above, where the node B 604 is to be activated before the node C 606, the ADAG formed from the EDDG 800 for the activation set of node B 604 provides the desired order. Delay node 808 can provide a delay from node A 602 to node C 606 such that the activation of node B 604 can occur prior to the activation of node C 606.

Similarly, for the activation set {B}, where the node C 606 is to be activated before node A 602, the EDDG 800 including delay node 810 can provide an ADAG having the desired activation order. The delay node 810 provides a delay from node B 604 to node A 602 such that node C 606 is activated prior to node A 602.

The delay nodes 808 and 810 can represent one or more delay nodes linked in series by directed edges to provide a particular delay amount. In one implementation, the final delay node 810 is coupled to the destination node 704 by the invertible edge pair 712. By establishing the final path between delay node and destination node as an invertible edge pair, the correct partner suppression can be maintained during the activation algorithm used in forming the ADAG. Thus, in the EDDG 800 described above, the invertible edge from node A 602 to node C 606 and the invertible edge from node B 604 to node A 602 allow for the suppression of the paths from node A 602 to node C 606 and from node B 604 to node A 602 when node C 606 or node A 602 are respectively activated. Consequently, by correctly positioning delay paths in an EDDG, a particular activation order of nodes can be provided. Additionally, the invertible edge from a delay node to a destination node can be used to provide an activated graph that is acyclic when the nodes are activated.

Figure 9:
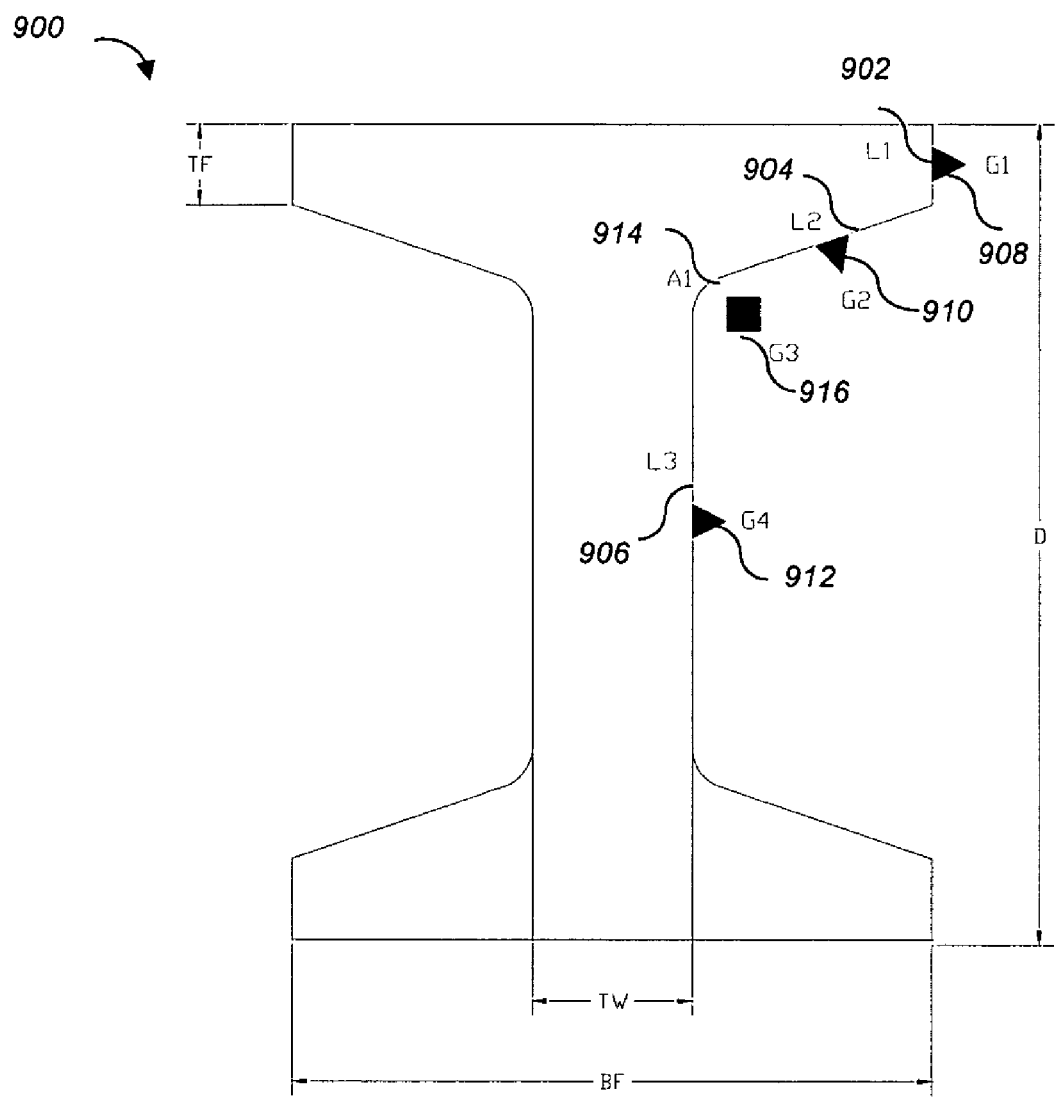
FIG. 9 shows an I-Beam including dependant editable elements.

When a user of a CAD program manipulates, or edits, an element in an object, the associated dependency values can be automatically modified using the dependency relationships in an ADAG associated with the activated element. For example, FIG. 9 shows a drawing object (i.e., an I-beam 900) in which the correct evaluation of dependencies can depend upon establishing the correct activation order. The I-beam 900 represents an S-section I-Beam including elements for line segments L1 902, L2 904, and L3 906. The values of the line segments L1 902, L2 904, and L3 906 can be directly edited through element fields G1 908, G2 910, and G4 912 respectively. The I-beam 900 also includes an element for fillet radius 914. The fillet radius 914 can also be directly edited through element field G3 916. The geometry of the I-beam 900 is dependent upon the values for the line segments L1 902, L2 904, and L3 906 and the value of the fillet radius 914. Consequently, an edit to one line segment can affect the values of one or more other line segment elements. In one implementation, the fillet radius 914 is applied to the I-beam 900 after the linear geometry is computed from the line segments L1 902, L3 904, and L3 906. Additionally, the geometries of the line segments L1 902, L2 904, and L3 906 can depend upon one or more standard table of geometries for I-beam objects.

Figure 10:
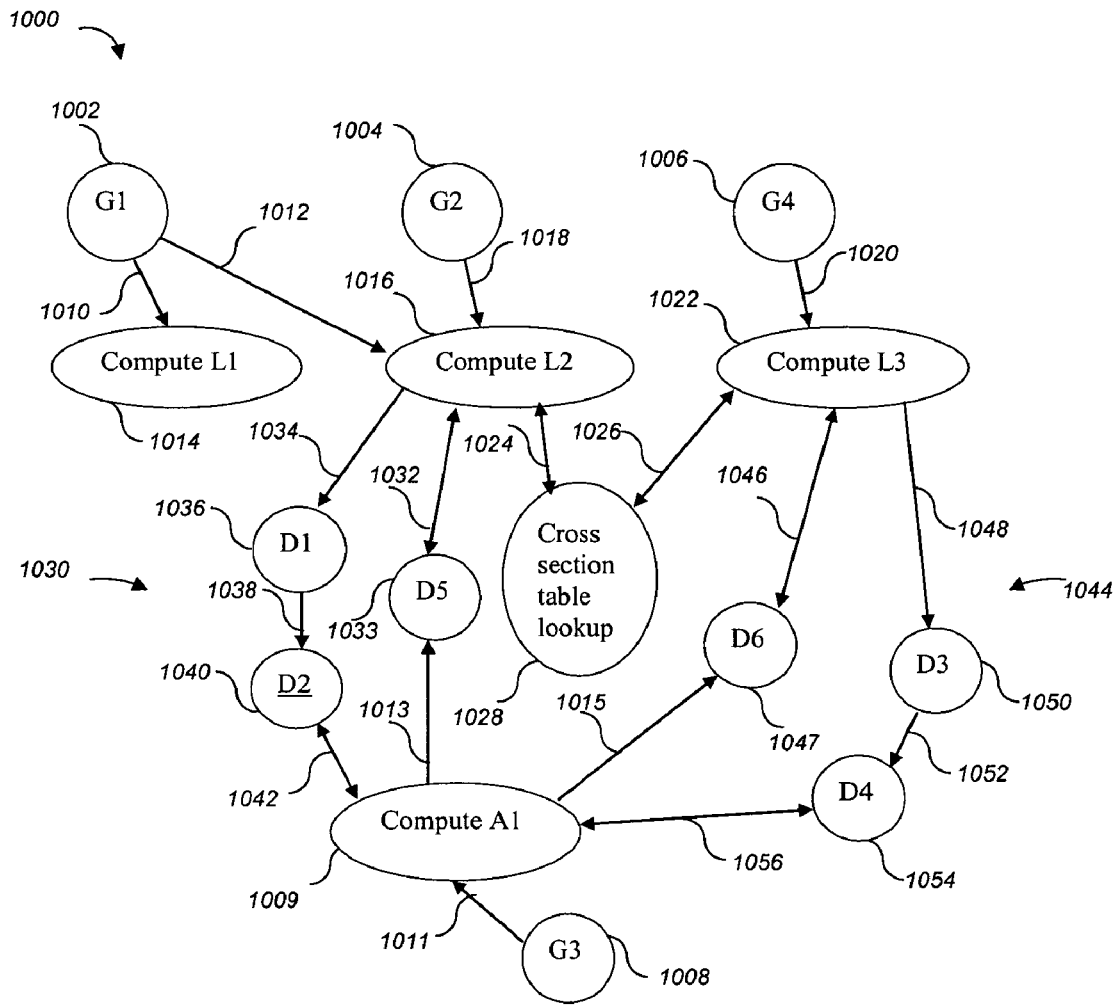
FIG. 10 shows an EDDG, including delay paths, generated for the I-Beam of FIG. 9.

FIG. 10 shows a simplified example of an EDDG 1000 representing the I-beam 900 of FIG. 9 that can be used to derive ADAGs for solving dependencies in the elements of the I-beam 900. The EDDG 1000 includes a number of delay paths for providing a required activation order if the line segments L1 902, L2 904, or L3 906 are changed by an edit to either G1, G2, or G4 respectively. The EDDG 1000 includes nodes G1 1002, G2 1004, and G4 1006 representing edited inputs to the line segment L1 902, L2 904, and L3 906 through G1 908, G2 910, and G4 906. The node G3 1008 corresponds to a direct edit of the fillet radius 914 through element field G3 916. A directed edge 1011 exists from node G3 1008 to a compute A1 node 1009 (e.g., compute fillet arc radius) corresponding to the fillet radius 914. There is also a directed edge 1010 from node G1 1002 to compute line segment L1 node 1014 and directed edge 1012 from node G1 1002 to compute line segment L2 node 1016. Compute line segment L1 node 1014 is the calculated length of line segment 902 based on the value of G1 1002.

Node G2 1004 includes a directed edge 1018 to the compute line segment L2 node 1016 corresponding to the line segment L2 904. The node G4 1006 includes a directed edge 1020 to a compute line segment L3 node 1022 corresponding to the line segment L3 906. Compute segment nodes L3 1016 and L3 1022 include respective invertible edge pairs 1024 and 1026 linking the compute line segment L2 node 1016 and the compute line segment L3 node 1022 to a cross-section table lookup node 1028. Additionally, invertible edge pairs 1032 and 1046 link compute segment L2 node 1016 and compute segment L3 with delay nodes 1033 and 1047 respectively. Directed edges 1013 and 1015 link the compute A1 node 1009 with the delay nodes D5 1033 and D6 1047 respectively.

The compute line segment L2 node 1016 is also linked to compute A1 node 1009 through delay path 1030. Delay path 1030 includes a first directed edge 1034 from the compute line segment L2 node 1016 to a first delay node D1 1036 and a second directed edge 1038 from the first delay node D1 1036 to a second delay node D2 1040. Finally, the delay path 1030 also includes an invertible edge pair 1042 between the second delay node 1040 and the compute A1 node 1009.

Similarly, the compute line segment L3 node 1022 is also linked to the compute A1 node 1009 through a delay path 1044. The delay path 1044 includes a first directed edge 1048 from the compute line segment L3 node 1022 to a first delay node D3 1050 and a second directed edge 1052 from the first delay node D3 1050 to a second delay node D4 1054. Finally, the delay path 1044 also includes an invertible edge pair 1056 between the second delay node D4 1054 and the compute A1 node 1009.

In one implementation, the delay paths 1030 and 1044 can be used to provide a particular activation order for the nodes in a resulting ADAG when either G2 1004 or G4 1006 are edited such that the geometry of the fillet radius is calculated after the linear geometry is determined. In another implementation, if G3 1008 is directly edited instead (e.g., the activation set is {G3}), the rest of the geometry for the I-beam (e.g., I-beam 900) is not modified except for the end points of the line segment L2 904 and L3 906 incident on the fillet radius 914. The corresponding changes to the compute segment L2 1016 and L3 1022, for the change in endpoint values when the edited fillet radius 1009 is applied, can occur in any order.

In one implementation, when G2 1004 is edited (e.g., the activation set is {G2}), the activation sequence for creating an ADAG providing the correct activation order is as follows. Editing element G2 910 activates G2 1004 in the EDDG 1000, initiating the activation algorithm. The compute line segment L2 node 1016 is activated next through directed edge 1018. The compute line segment L2 node 1016 is dependent upon the edited value of G2 1004 as well as the existing value of G1 1002 provided through directed edge 1012. The compute line segment L2 node 1016 uses the values of both G1 and G2 to calculate the geometry of the line segment 904 in I-beam 900.

Following activation of the compute segment L2 1016, the cross-section table lookup 1028 and delay node 1036 are activated. A directed edge links the compute segment L2 node 1016 with the delay node D1 1036 along delay path 1030. An invertible edge pair 1024 links the compute segment L2 node 1016 with the cross-section table lookup 1028. Consequently, the partner invertible edge (of invertible edge pair 1024) directed from the cross-section table lookup 1028 to the compute line segment L2 node 1016 is suppressed. The cross-section table lookup 1028 uses the computed length from the compute line segment L2 node 1016 to lookup the geometry associated with the I-beam 900 segment length 910 for the calculated value of the compute segment length 1016. Additionally, the compute segment L2 1016 is linked to the delay node 1033 through invertible pair 1032. Thus, the delay node 1033 is activated at substantially the same time as the delay node 1036 and cross-section table lookup 1028. Because the invertible edge of the invertible edge pair 1032 that is outgoing from the delay node D5 1033 is suppressed, there are no outgoing edges from the delay node 1033. As a result, the activation along the path through delay node 1033 stops.

Nodes incident to the outgoing edges of the delay node 1036 and the cross-section table lookup node 1028 are then activated. A second delay node D2 1040, linked to delay node D1 1036, is activated through directed edge 1038. The cross-section table lookup 1028 is linked to the compute segment L3 1022 through invertible edge pair 1026. The partner invertible edge of the invertible edge pair 1026 is suppressed. In one implementation, the cross-section table lookup provides geometry information for I-beam geometries.

The compute segment L3 node 1022 is activated such that line segment 906 of the I-beam 900 is defined according to the geometry from the cross-section table lookup 1028 and the existing length value provided by G4 1006. Thus, the linear geometry for the I-beam 900 has been completely computed prior to activation of the compute A1 node 1009.

The nodes incident to the outgoing edges of the compute line segment L3 node 1022 and the delay node D2 1040 are activated next. The outgoing edges from the compute line segment L3 node 1022 includes an outgoing directed edge 1048 to delay node D3 1050 along delay path 1044 and an invertible edge pair 1046 linking the compute line segment L3 node 1022 with a delay node D6 1047. The compute A1 node 1009 is linked to the delay node D6 1047 through a directed edge 1015. Consequently, an activation of the delay node 1047 through invertible edge pair 1046 will end the activation path because there are no non-suppressed outgoing edges from the delay node 1047.

The delay node D2 1040 is linked to the compute A1 node 1009 through invertible edge pair 1042. Consequently, the delay node D3 1050, delay node D6 1047, and the compute A1 node 1009 are activated, although again the activation order between the delay node 1050 and the compute A1 node 1009 does not matter and can occur substantially at the same time without affecting any dependency relationships. Finally, the activation algorithm ends with the activation of the delay node 1054 through directed edge 1052, the delay node D4 1054 having no non-suppressed outgoing edge. The delay node 1054 is activated at substantially the same time through both invertible edge pair 1056 and directed edge 1052. As a result, the partner invertible edge from delay node 1054 to the compute fillet radius 1009 is suppressed.

In the ADAG that results from the activation algorithm applied for the activation of {G2}, the use of the delay nodes 1036 and 1040 provide a delay that allows the value of the compute L3 node 1022 to be calculated prior to the calculation of the compute A1 node 1009. Additionally, as a result of the delay path 1030 the compute fillet radius 1009 is activated after the compute segment L2 1016 and compute segment L3

1022. Consequently, the fillet radius 914 can be applied to the I-beam 900 after the linear geometry has been computed.

When G4 1006 is edited (e.g., activation set {G4}), the activation sequence is symmetric to the activation sequence when G2 1004. Consequently, the introduced delay path 1044 in the EDDG 1000 again provides for the linear geometry of the I-beam 900 to be calculated prior to applying the fillet radius 914.

In an alternative implementation, when G3 1008 is edited (e.g., activation set {G3}), the sequence is more direct because the changes to the line segment geometry of segment L2 and segment L3 resulting from a change in the filet radius can occur in any order. According to the activate algorithm, an edit to G3 1008 causes a change along directed edge 1011 to compute the value for computeA1 node 1009. Nodes incident to outgoing edges are activated and incoming invertible edges are suppressed. Consequently, the compute segment L2 1016 and compute segment L3 1022 are calculated based on the new value for the calculated fillet radius 1009 after delay nodes D5 and D6 respectively. A change in the compute A1 node 1009 leads to a change in the end points of compute segments L2 and L3 1016 and 1022, which represent line segments 912 and 910 incident on the fillet radius 914.

Additionally, because of the invertible edges 1042 and 1056, the delay nodes D2 1040 and D4 1050 are also activated following the calculating node A1 1009. However, there are not any non-suppressed outgoing edges from either delay node D2 1040 or delay node D4 1050 so the activation path along both routes ends with the delay node activation. The activation of the computed segment nodes L2 1016 and L3 1022 and the delay nodes D2 1040 and D4 1054 can occur in any order. The compute segment nodes L2 1016 and L3 1022 are activated through invertible edge pairs 1032 and 1046 respectively. As a result, the corresponding outgoing invertible edge of the invertible pairs 1032 and 1046 are suppressed. The final step is to activate the cross-section table lookup 1028 through invertible edges 1024 and 1026. However, because the cross-section table lookup 1028 is activated from both invertible edge pairs 1024 and 1026, the table information has no outgoing non-suppressed edge back to the compute line segment L2 node 1016 or compute line segment L3 node 1022. Thus, the cross-section table lookup 1028 does not impact the values of the line segments L2 904 or L3 906.

In one implementation, the behavior of an activated node can vary depending on the incoming edge at the time of evaluation. For example, the compute line segment L2 node 1016 can behave differently depending on the input. When the input to the compute line segment L2 node 1016 is from the computeA1 node 1009, the activation of the compute line segment L2 node 1016 establishes the endpoint of the line segment L2 904 on the fillet radius arc 914. Alternatively, input to compute line segment L2 node 1016 from the cross-section table lookup 1028 provides the geometry of line segment L2 904 using table values. Finally, if he compute line segment L2 node 1016 is activated through node G2 1004, the value of line segment L2 904 is set based on the value of G2 1004 provided through element field G2 910

Persisting an EDDG

The data associated with the nodes and edges for forming an EDDG for a particular object set can be stored in a persistent form. In one implementation, the data is stored in an electronic drawing file, for example, a drawing file for a CAD program. In one implementation, the data is stored in a drawing file of type .dwg or .dxf. Each node in an EDDG can be stored in an array of nodes as shown in Table 1.

TABLE 1

| Node1 | Node2 | Node3 | ... | NodeN |
|---|---|---|---|---|

An ordinal number can be give to each node representing the entry occupied in the node array.

Similarly, each Edge of an EDDG can also be stored in an array of edges as shown in Table 2.

TABLE 2

| Edge1 | Edge2 | Edge3 | ... | EdgeE |
|---|---|---|---|---|

As with the node array, each edge of the array is assigned an ordinal number which denotes the entry occupied in the edge array. In one implementation, the node and edge data is written into the arrays in the sequence in which the nodes and edges are encountered in the EDDG.

In one implementation, each entry in the node and edge arrays includes data items persisted in integer form and that resolve as memory pointers to object elements in a CAD application. An example of the data stored in a node entry is shown in Table 3.

TABLE 3

NodeID
DataPointer
OutStartEdgeID
OutEndEdgeID
InStartEdgeID
InEndEdgeID
Flags

The node entry includes a node ID, a data pointer, a number of edge IDs for incoming and outgoing edges, and one or more flags. The OutStartEdgeID identifies the beginning of an outgoing edge while the OutEndEdgeID identifies the end of an outgoing edge. Similarly, the InStartEdgeID identifies the starting point of an incoming edge while the InEndEdgeID identifies the ending point of an incoming edge. By storing the beginning and ending points of the edges associated with a particular node, the node can be linked with other nodes with complimentary edge IDs. For example, for two nodes linked by a same edge, the OutStartEdgeID of the first node can match the InEndEdgeID of the node linked by that edge.

Additionally, the edge entries in the edge array also store a number of data items. An example of the data stored in an edge entry is shown in Table 4.

TABLE 4

EdgeID
ToNodeID
FromNodeID
PrevInEdgeID
NextInEdgeID
PrevOutEdgeID
NextOutEdgeID
InvertibleEdgePartnerID
Flags The edge entry includes an Edge ID, a number of node IDs, one or more invertible edge partner ID, and one or more flags. The node IDs identify the nodes linked by the edge. The ToNodeID identifies the destination node for the edge while the FromNodeID identifies the origin node for the edge. The previous and next incoming and outgoing edge IDs identify edges as part of the sequence in which the edges appear in the EDDG. The invertible Edge Partner ID identifies the partner link between a pair of invertible edges. Finally, the flags include data on the invertability and suppression bit information for the edge.

Figure 11:
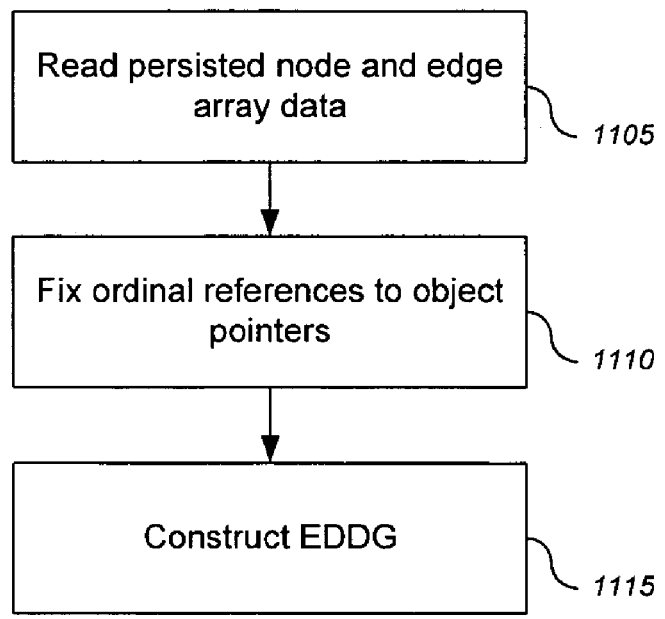
FIG. 11 is a method for forming an EDDG from persistent data.

In one implementation, the node and edge arrays can be used to reconstitute an EDDG from the persisted data. FIG. 11 shows a process 1100 for an algorithm to reconstitute an EDDG from the data in the node and edge arrays. The components of the EDDG that are stored in the persisted data are the nodes and edges. The node and edge objects, however, can be stored in arrays in an in-memory representation. The persisted node and edge data can have a natural ID (i.e., an ordinal number) corresponding to the entry in the array occupied by the particular node or edge. The persisted data, therefore, is the ID associated with each individual node or edge as well as IDs for reference other nodes and edge objects as shown in Tables 3 and 4.

The in-memory representation (versus an on disk or persistent representation) can use pointers instead of IDs for the various fields in Tables 3 and 4. Thus, for example, instead of the OutStartEdgeID field of a node, the node has a pointer to the OutStartEdge object.

In one implementation, the process of reconstituting an EDDG includes converting the persistent representation to an in-memory representation. The persisted data for the node and edge arrays are read (step 1105). The persistent representation of the nodes and edges are read into in-memory node and edge objects. For each node represented in persistent data, an in-memory node is allocated and stored in the nodes array. The location of the in-memory node object in the array (i.e. the array index corresponding to where the node is stored) is the oridinalID for that node. Similarly, for each edge represented in persistent data, an in-memory edge is allocated and stored in the location in the edges array corresponding to the edge ordinal ID. The links within the edge and node in-memory objects to other node and edge objects are still ordinal IDs.

In step 1105, the in-memory node and edge objects can be allocated. However, the node-node, edge-edge and node-edge and edge-node references are still in the form of the ordinal IDs for nodes and edges. The ordinal IDs references are then fixed to object pointers (step 1110). Thus the nodeID data members are converted in to node pointers and the edgeID data members are converted in to edge pointers. The in-memory node and edge objects and pointers can then be used to construct a particular EDDG (step 1115).

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middle-ware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. Additionally, the use of invertible edge and delay paths can be used outside of a CAD system in other applications where various actions and dependencies between actions are evaluated. For example, other applications include graphical applications such as animation as well as applications for expression evaluation. Finally, the persistent data can be reconstituted in a form other then a dependency graph, for example, an incident matrix.

What is claimed is:

1. A method, comprising:
   receiving a file including:
      a node array having data entries corresponding to one or more nodes; and
      an edge array having data entries corresponding to one or more edges, the edge entries identifying an invertability state of an edge, a suppressed state of an edge, and one or more partner edge linking a first and a second edge in the edge array; and
   processing the file using one or more computers.

2. The method of claim 1, the data entry for each node further comprising:
   an identifier for a beginning and ending point for each incoming and outgoing edge to the node.

3. The method of claim 1, the data entry for each edge further comprising:
   an identifier of each node associated with the edge.

4. The method of claim 1, the data entry for each edge further comprising:
   an identifier of the edge as invertible.

5. The method of claim 4, the data entry for an invertible edge further comprising:
   a flag identifying a suppression state of the invertible edge.

6. The method of claim 1, the data entries for the edges in the edge array further comprising:
   an identifier for each partner link between pairs of invertible edges.

7. The method of claim 1, the processing including creating an enhanced directed dependency graph using the data entries in the node and edge arrays.

8. A method for evaluating dependencies in a cyclic system, comprising:
   receiving a description of a cyclic system;
   receiving a particular activation context, the particular activation context identifying one or more nodes in the cyclic system as being activated;
   creating an activation directed acyclic graph for the particular activation context; and
   evaluating, using one or more computers, one or more dependencies upon a change of a state of the cyclic system in accordance with the activation context.

9. The method of claim 8, further comprising:
   creating an enhanced directed dependency graph description of the cyclic system, including introducing one or more delay nodes operable to provide a particular activation order in an activation directed acyclic graph.

10. The method of claim 9, further comprising:
    positioning each delay node along an edge between a first node and a second node.

11. The method of claim 10, further comprising:
    connecting the delay node to a destination node by an invertible edge.

12. A method for evaluating an enhanced directed dependency graph, comprising:
    adding, using one or more computers, an initially edited node to a queue;
    activating a first node in the queue;
    suppressing any partner incoming invertible edge for each outgoing non-suppressed invertible edge leading from the first node;
    adding a next node incident to the first node through outgoing non-suppressed invertible edges to the queue; and
    activating the next node in the queue.

13. The method of claim 12, further comprising:
    suppressing any partner incoming invertible edge for each outgoing non-suppressed invertible edge leading from the next node; and
    adding one or more nodes incident to the next node through outgoing non-suppressed invertible edges to the queue.

14. The method of claim 12, further comprising:
    suppressing any remaining nodes and edges of the enhanced directed dependency graph when the queue is empty.

15. A computer program product, tangibly stored on a machine-readable storage device, comprising instructions operable to cause a programmable processor to:
    receive a file including:
       a node array having data entries corresponding to one or more nodes; and
       an edge array having data entries corresponding to one or more edges, the edge entries identifying an invertability state of an edge, a suppressed state of an edge, and one or more partner edge linking a first and a second edge in the edge array; and
    process the file.

16. The computer program product of claim 15, the data entry for each node further comprising:
    an identifier for a beginning and ending point for each incoming and outgoing edge to the node.

17. The computer program product of claim 15, the data entry for each edge further comprising:
    an identifier of each node associated with the edge.

18. The computer program product of claim 15, the data entry for each edge further comprising:
    an identifier of the edge as invertible.

19. The computer program product of claim 18, the data entry for an invertible edge further comprising:
    a flag identifying a suppression state of the invertible edge.

20. The computer program product of claim 15, the data entries for the edges in the edge array further comprising:
    an identifier for each partner link between pairs of invertible edges.

21. The computer program product of claim 15, the processing including instructions to:
    create an enhanced directed dependency graph using the data entries in the node and edge arrays.

22. A computer program product, tangibly stored on a machine-readable storage device, for evaluating dependencies in a cyclic system, comprising instructions operable to cause a programmable processor to:
    receive a description of a cyclic system;
    receive a particular activation context, the particular activation context identifying one or more nodes in the cyclic system as being activated;
    create an activation directed acyclic graph for the particular activation context; and
    evaluate one or more dependencies upon a change of a state of the cyclic system in accordance with the activation context.

23. The computer program product of claim 22, further comprising instructions to:
    create an enhanced directed dependency graph description of the cyclic system, including introducing one or more delay nodes operable to provide a particular activation order in an activation directed acyclic graph.

24. The computer program product of claim 23, further comprising instructions to:
  position each delay node along an edge between a first node and a second node.

25. The computer program product of claim 24, further comprising instructions to:
  connect the delay node to a destination node by an invertible edge.

26. A computer program product, tangibly stored on a machine-readable storage device, for evaluating an enhanced directed dependency graph, comprising instructions operable to cause a programmable processor to:
  add an initially edited node to a queue;
  activate a first node in the queue;
  suppress any partner incoming invertible edge for each outgoing non-suppressed invertible edge leading from the first node;
  add a next node incident to the first node through outgoing non-suppressed invertible edges to the queue; and
  activate the next node in the queue.

27. The computer program product of claim 26, further comprising instructions to:
  suppress any partner incoming invertible edge for each outgoing non-suppressed invertible edge leading from the next node; and
  add one or more nodes incident to the next node through outgoing non-suppressed invertible edges to the queue.

28. The computer program product of claim 26, further comprising instructions to:
  suppress any remaining nodes and edges of the enhanced directed dependency graph when the queue is empty.

\* \* \* \* \*

UNITED STATES PATENT AND TRADEMARK OFFICE
CERTIFICATE OF CORRECTION

PATENT NO. : 7,620,947 B2  Page 1 of 1
APPLICATION NO. : 11/077966
DATED : November 17, 2009
INVENTOR(S) : Ravinder Krishnaswamy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this
Twenty-eighth Day of December, 2010

David J. Kappos
*Director of the United States Patent and Trademark Office*